Oct. 25, 1932.  H. J. STEGEMAN  1,884,340

ROLL

Filed Sept. 4, 1930

INVENTOR.
Henry J. Stegeman
BY
ATTORNEYS.

Patented Oct. 25, 1932

1,884,340

UNITED STATES PATENT OFFICE

HENRY J. STEGEMAN, OF FAIRFIELD, CONNECTICUT, ASSIGNOR TO LOCKE STEEL CHAIN COMPANY, OF BRIDGEPORT, CONNECTICUT, A CORPORATION OF CONNECTICUT

ROLL

Application filed September 4, 1930. Serial No. 479,641.

This invention relates to a novel and improved form of roll, more particularly, a traction roll adapted to support a machine which is to be moved over the ground, or over any other supporting surface. The invention will be best understood from the following description and the annexed drawing, in which I have shown a selected embodiment of the invention, and in which Fig. 1 is a longitudinal sectional view through a roll constructed according to my invention;

Figure 1:
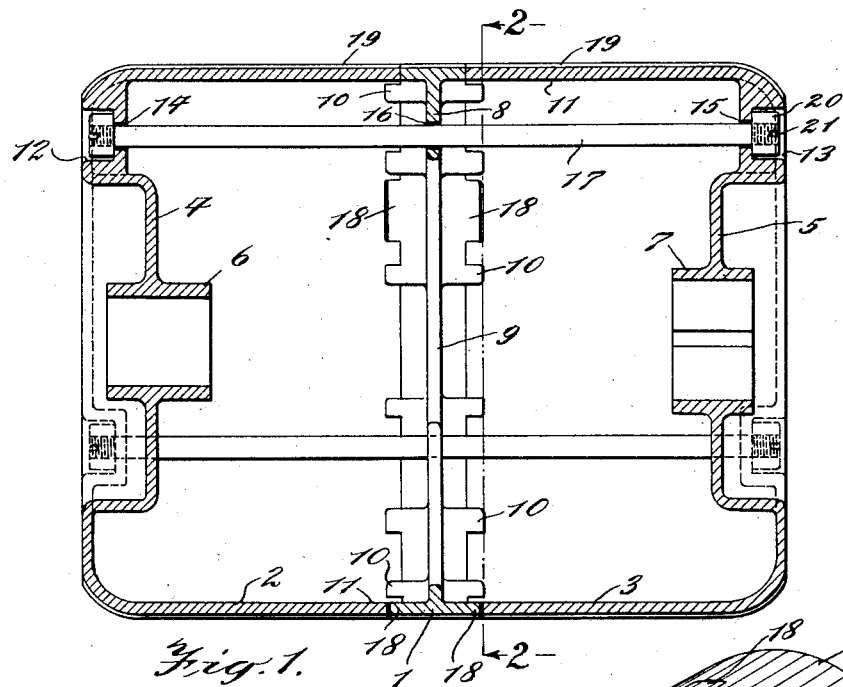

According to my invention, I form the roll in a plurality of parts here shown as three, the parts being a centrally disposed ring 1 and end portions 2 and 3, one disposed on each side of the ring. The end portions comprise ends 4 and 5 which I shall consider as closed ends. These ends are substantially closed, except for bearings 6 and 7 formed therein. These bearings are adopted to receive a shaft or shafts to support a machine carried by the roll.

The ring has a plurality of ears 8 extending radially inwardly and is also provided with a circumferentially extending rib 9 which also extends radially inwardly, and, in fact, is an integral part of the ears 8 in this embodiment. Extending axially of the roll from the rib 9 is a plurality of lugs 10 which contact with the inner surface 11 of the end portions 2 and 3.

The ends 4 and 5 are provided with recesses 12 and 13 adapted to receive bolt heads or bolt nuts, as the case may be, and at the bottoms of these recesses are bolt holes 14 and 15 which, when the different parts are assembled, should be in alinement with bolt holes 16 in the ears 8 so that long bolts 17 may pass through the alined holes and secure the three parts of the roll together. In order to insure this alinement of the bolt holes, the ring is provided with a plurality of axially extending lugs 18, best shown in Fig. 3. These lugs are disposed in correspondingly shaped recesses 18' in the portions 2 and 3, and are shown as extending in opposite directions from the ring and as being three in number equally spaced about the circumference of the ring. It is, of course, to be understood that the number and location of these lugs may vary without departing from the scope of this invention. The edges of the lugs 18 appear also in Fig. 2 and in elevation and section in Fig. 1. These lugs have their outer surfaces continuous with the outer surface of the ring and when the parts are assembled, these surfaces are all continuous with the cylindrical outer surfaces 19 of the end portions 2 and 3, so as to form a substantially cylindrical surface for the roll or drum. The lugs 18 are so disposed with respect to the bolt holes in the ears and ends that when the parts are assembled the bolts will slide easily through these holes, which will be in alinement with each other.

Figure 3:
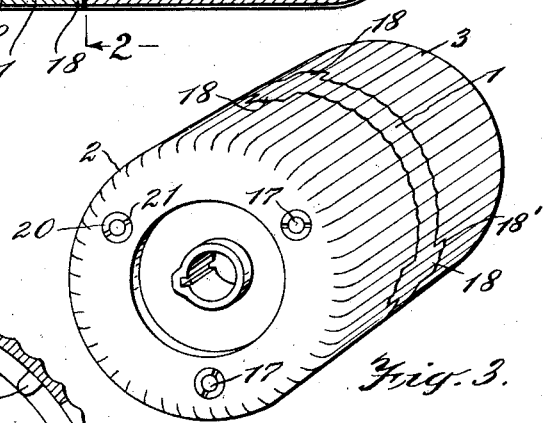
Fig. 3 is a perspective view of the assembled roll.
Figure 2:
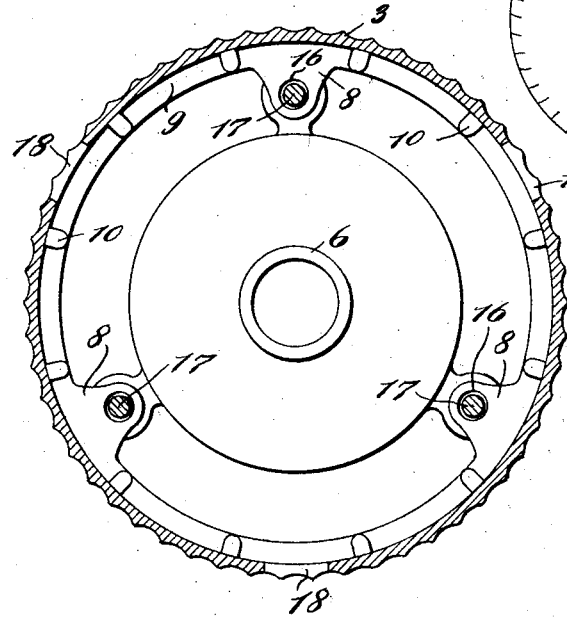
Fig. 2 is a section on the line 2—2 of Fig. 1.

By the above arrangement I have provided a roll or drum which may be made closed at both ends, if desired, although in this embodiment I show only substantially closed ends, because, in this particular form, the ends are used for bearings for a shaft. This roll may also be made by molding with green sand without the use of a core, thus greatly cheapening the process of manufacture. Another advantage is that the central ring may be made as shown with the strengthening rib 9, thus forming a central reinforcement for the entire roll. This reinforcement is made effective also by the provision of the lugs 10 which support the edges of the end portions 2 and 3 when the parts are assembled. This arrangement prevents collapsing of the roll or drum near its center which, with a one-piece roll, is, of course, its weakest portion. The lugs 10 also aid in assembling the parts and the lugs 18 form a positive lock between the various parts so as to prevent relative rotation of one with respect to the other. They also, as pointed out above, aline the bolt holes for the insertion of the bolts. As shown in Figs. 1 and 3, the bolts are in the form of rods with threaded ends having each end engaged by a nut having means 21 for engagement by a suitable tool.

When the parts are all assembled, as shown, the result is a tractor roll or other roll or drum which may be made at a low cost and which, when assembled, has all the efficiency of a one piece construction. In fact, the parts will act as one to such an extent that the entire roll may be driven from one end without distortion or undue strain thereon.

I claim:

1. A cylindrical tractor roll comprising a ring and two end portions disposed one on each side of said ring on a common axis, said ring and end portions having cylindrical ground-engaging surfaces of equal diameters and said end portions having substantially closed ends, lugs on said ring engaging the inner surfaces of said end portions to register the ground-engaging surfaces of the ring and end portions, and means securing said ring and end portions together.

2. A cylindrical tractor roll comprising a ring and two end portions disposed one on each side of said ring on a common axis, said ring and end portions having cylindrical ground-engaging surfaces of equal diameters and said end portions having substantially closed ends, lugs on said ring engaging the inner surfaces of said end portions to register the ground-engaging surfaces of the ring and end portions, and bolts passing through alined holes in said ends and ring and holding the ring and end portions together.

3. A cylindrical tractor roll comprising a ring and two end portions disposed one on each side of said ring on a common axis, said ring and end portions having cylindrical ground-engaging surfaces of equal diameters and said end portions having substantially closed ends, lugs on said ring engaging the inner surfaces of said end portions to register the ground-engaging surfaces of the ring and end portions, bolts passing through alined holes in said ends and rings and holding the ring and end portions together, and cooperating means on said ring and end portions to aline said bolt holes.

4. A cylindrical tractor roll comprising a ring and two end portions disposed one on each side of said ring on a common axis, said ring and end portion having cylindrical ground-engaging surfaces of equal diameters and said end portions having substantially closed ends, lugs on said ring engaging the inner surfaces of said end portions to register the ground-engaging surfaces of the ring and end portions, means securing said ring and end portions together, and means preventing relative movement between the ring and end portions about said axis.

5. A cylindrical tractor roll comprising a ring and two end portions disposed one on equal side of said ring on a common axis, means on said ring engaging the inner surfaces of said end portions, an inwardly extending reinforcing rib on said ring, said end portions having substantially closed ends, bolts passing through alined holes in said ends and ring to hold the ring and end portions together, and cooperating lugs and recesses on said ring and end portions to aline said bolt holes.

HENRY J. STEGEMAN.